(12) United States Patent
Yonezawa et al.

(10) Patent No.: US 8,971,027 B2
(45) Date of Patent: Mar. 3, 2015

(54) DISPLAY DEVICE CABINET

(75) Inventors: Hideo Yonezawa, Daito (JP); Yuki Kita, Daito (JP); Akihiro Fujikawa, Daito (JP); Kenji Ogura, Daito (JP); Tsukasa Fujimoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/554,129

(22) Filed: Jul. 20, 2012

(65) Prior Publication Data

US 2013/0033824 A1 Feb. 7, 2013

(30) Foreign Application Priority Data

Aug. 1, 2011 (JP) ................................. 2011-168698

(51) Int. Cl.
*H05K 5/00* (2006.01)
*H05K 7/00* (2006.01)
*G06F 1/16* (2006.01)

(52) U.S. Cl.
CPC ................................... *G06F 1/1601* (2013.01)
USPC ............. 361/679.21; 361/679.22; 361/679.26

(58) Field of Classification Search
CPC ....... G06F 1/16; G06F 1/1601; G06F 1/1603; G06F 1/1605; G06F 1/1607; G06F 1/1611
USPC ............... 361/679.21, 679.26, 679.3, 679.55, 361/679.56, 679.22
See application file for complete search history.

(56) References Cited

U.S. PATENT DOCUMENTS

| 6,813,159 | B2 * | 11/2004 | Irie et al. ........................ 361/752 |
| 7,576,976 | B2 * | 8/2009 | Kawano ................... 361/679.21 |
| 7,599,016 | B2 * | 10/2009 | Lo et al. ........................... 349/56 |
| 7,688,575 | B2 * | 3/2010 | Takayanagi et al. ...... 361/679.21 |
| 7,697,272 | B2 * | 4/2010 | Choi ......................... 361/679.21 |
| 8,014,142 | B2 * | 9/2011 | Prest et al. .................. 361/679.3 |
| 8,199,488 | B2 * | 6/2012 | Zou et al. .................. 361/679.55 |
| 8,218,306 | B2 * | 7/2012 | Lynch et al. ................ 361/679.3 |
| 8,243,429 | B2 * | 8/2012 | Zadesky et al. ........... 361/679.21 |
| 2003/0103173 | A1 * | 6/2003 | Satonaka ......................... 349/58 |
| 2003/0169573 | A1 * | 9/2003 | Irie et al. ........................ 361/752 |
| 2008/0297013 | A1 | 12/2008 | Iwai et al. |
| 2009/0059485 | A1 * | 3/2009 | Lynch et al. ............. 361/679.01 |
| 2010/0182531 | A1 | 7/2010 | Teratani |

FOREIGN PATENT DOCUMENTS

| JP | 2008-298964 A | 12/2008 |
| JP | 2009-151112 A | 7/2009 |
| JP | 2010-191407 A | 9/2010 |

OTHER PUBLICATIONS

Official Communication issued in corresponding European Patent Application No. 12178678.4, mailed on Oct. 15, 2014.

* cited by examiner

*Primary Examiner* — Anthony Haughton
(74) *Attorney, Agent, or Firm* — Keating & Bennett, LLP (57) ABSTRACT

In a display device cabinet, a fixing assembly to join a front panel and a rear panel include a first fixing mechanism that uses attachment screws and a second fixing mechanism that uses no attachment screws, which have a structure that prevents the application of excessive force to engaging openings and protrusions during the assembly process and disassembly process. The second fixing mechanism includes protrusions on an edge frame of the front panel, a mating piece provided on the rear panel, engaging openings provided in the mating piece, and rib-shaped plates defining stopper elements between the edge frame and the outer frame of the display module. The stopper elements prevent the protrusions from slipping out of the engaging openings by contacting the outer frame. The stopper elements are shaped to prevent interference between the stopper elements and the outer frame during cabinet assembly.

11 Claims, 6 Drawing Sheets

Fig. 6 Prior Art

DISPLAY DEVICE CABINET

BACKGROUND OF THE INVENTION

1. Field of the Invention

The present invention relates to a display device cabinet for use with thin liquid crystal televisions, for example, and particularly to a display device cabinet that is formed by joining and joining a frame-shaped front panel, which is deployed around a display surface of a display module, with a rear panel.

2. Description of the Related Art

A cabinet formed by joining a frame-shaped front panel with a rear panel is widely adopted in display devices such as thin televisions and photo frames, and in general, the front panel and the rear panel are individually molded from a resin with each of the front and rear panels defining an integral unit. Furthermore, in this type of cabinet, a screw fastening mechanism using attachment screws is often adopted for a fixing mechanism for joining, in an integrated manner, the front panel with the rear panel joined to the front panel.

Meanwhile, a conventional example is also known which adopts for the fixing mechanism a combination of a first fixing mechanism that uses attachment screws and a second fixing mechanism that uses no attachment screws. This conventional example will be described with reference to FIG. 6.

Figure 6:
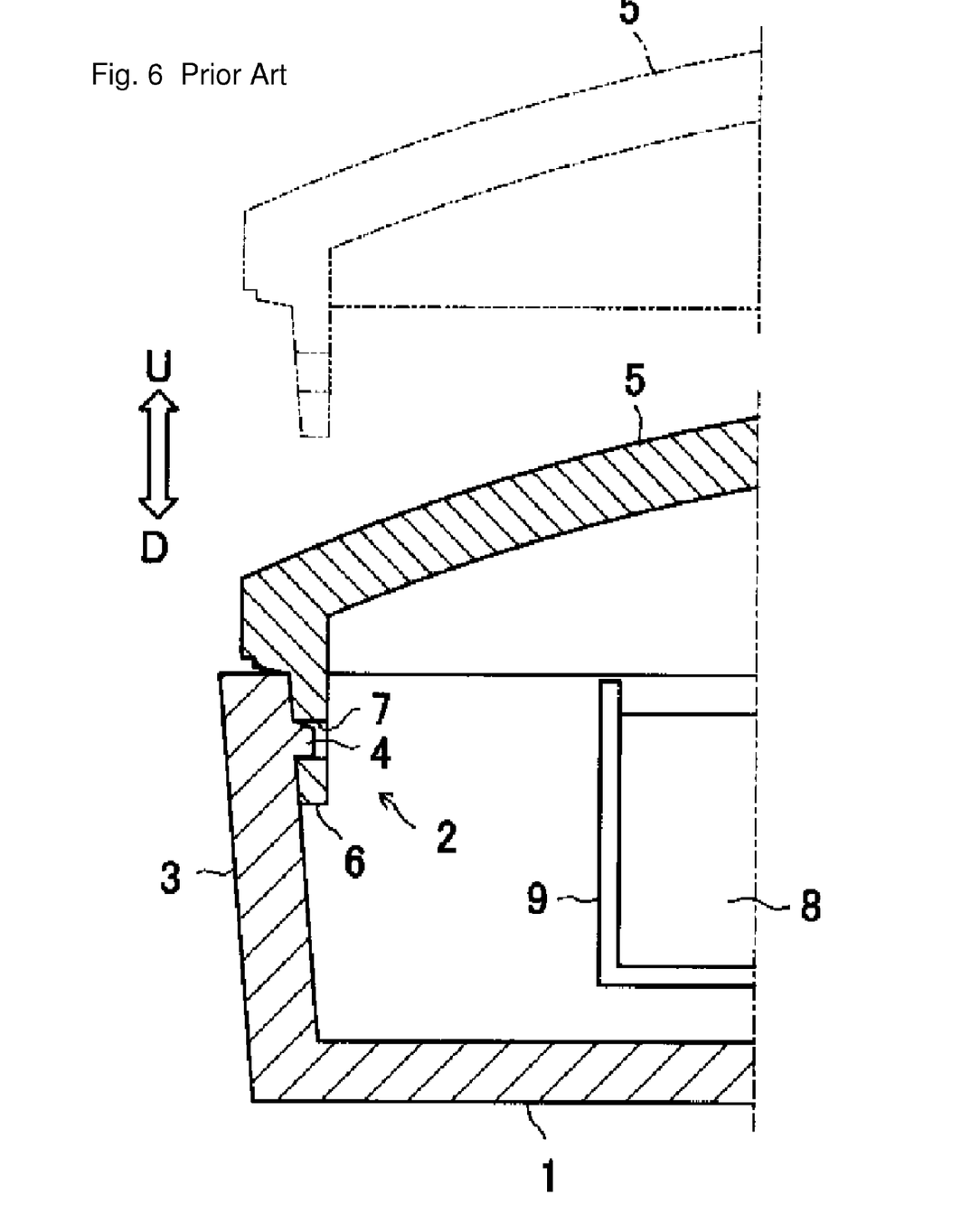
FIG. 6 is sectional view of principal portions of a conventional example.

FIG. 6 is sectional view of principal portions of the conventional example. This figure shows a state in which the cabinet of a vertically-placed-type thin liquid crystal television as a display device is placed in a laid-down orientation; 1 indicates a frame-shaped front panel, and 5 indicates a rear panel superimposed on the front panel 1. The front panel 1 houses a liquid crystal display module (display module) 8, and the frame-shaped front panel 1 is deployed around the display surface (not illustrated) of this display module 8. Moreover, the rear panel 5 joined to the front panel 1 is joined with the front panel 1 by the first fixing mechanism (not illustrated) that uses attachment screws at specified locations in the lower portion when the cabinet is placed vertically (locations in the vicinity of the lower ends). This first fixing mechanism is configured by screwing the attachment screws into bosses provided on the front panel 1, for example, via screw insertion holes formed in the rear panel 5. In addition, the rear panel 5 is joined with the front panel 1 by the second fixing mechanism 2 that uses no attachment screw at specified locations in the upper portion when the cabinet is vertically placed (locations in the vicinity of the upper ends).

The second fixing mechanism 2 according to the conventional example shown in FIG. 6 includes protrusions 4 arranged so as to protrude inward on the edge frame 3 of the front panel 1 that faces the outer frame 9 of the display module 8, a mating piece 6 that is provided on the rear panel 5 and that is fitted inside the edge frame 3 of the front panel 1 in an overlapping manner, and engaging openings 7 that are provided in the mating piece 6 and that respectively mate with the protrusions 4.

As was described above, in the conventional example shown in FIG. 6, the front panel 1 and the rear panel 5 are joined and joined by a fixing assembly including a combination of the first fixing mechanism and the second fixing mechanism 2. In this conventional example, the following work is performed in the cabinet assembly process: the rear panel 5 is carried in as indicated by the dotted lines in FIG. 6 directly above the front panel 1 to which the display module 8 is attached and which is in a laid-down orientation, for example, after which the rear panel 5 is brought down as in arrow D in the same figure, and the mating piece 6 thereof is therefore pushed in the inside of the edge frame 3 of the front panel 1. Then, when such a push-in work is performed, the mating piece 6 rides over the protrusions 4 while being flexed and deformed, so the engaging openings 7 respectively mate with the protrusions 4 as this mating piece 6 undergoes deformation recovery. While the engaging openings 7 and the protrusions 4 mate with each other in this manner, the protrusions 4 are engaged with the engaging openings 7 at these mating locations, so it is not very likely to have a situation in which the front panel 1 comes off of the rear panel 5 at these mating locations. Note that the work of joining the front panel 1 and the rear panel 5 by the first fixing mechanism is performed after performing the joining work using the second fixing mechanism 2.

On the other hand, when a need for reworking arises, a disassembly process is performed which involves the work of releasing the joined state by the second fixing mechanism 2 after releasing the joined state by the first fixing mechanism at the joining locations. With regard to the work of releasing the joined state by the second fixing mechanism 2, there is no choice but to strip off the engaging openings 7 in the mating piece 6 from the protrusions 4 on the side of the front panel 1 and to cause these engaging openings 7 to be forcibly disengaged from the protrusions 4 through the operation of pulling up the rear panel 5 as shown by arrow U in FIG. 6.

Because of this, in the conventional example, the protruding width of the protrusions 4 from the edge frame 3 is set such that the mating piece 6 can ride over the protrusions 4 with the push-in operation of the mating piece 6 during the assembly process and also such that the engaging openings 7 in the mating piece 6 can be disengaged from the protrusions 4 through the operation of stripping the engaging openings 7 off of the protrusions 4 during the disassembly process.

Meanwhile, it is indicated in a prior art example that a cabinet is joined using male screws with a frame-form holding body that sandwiches the peripheral portion of a liquid crystal panel between the holding body and a frame in a thin liquid crystal display device (see, for example, Japanese Patent Application Laid-Open Publication No. 2009-151112, especially FIG. 2).

It is indicated in another prior art example that in the structure of a housing for a video display device, if the housing and the display unit are fixed using claws, attachment and detachment for repair or the like become difficult, that the display unit and the main body case are fixed by screw fastening using fixing clasps, and the like (for example, see Japanese Patent Application Laid-Open Publication No. 2010-191407 (0007 and FIG. 4)).

Furthermore, yet another prior art example shows the structure of a cabinet for a thin display device formed by inserting protruding portions on the upper end portion of the front cabinet between recessed portions in the upper end portion of a front cover and projecting pieces on the upper end portion of the rear cabinet and causing the protruding and recessed portions to interlock (for example, see Japanese Patent Application Laid-Open Publication No. 2008-298964, especially, FIG. 6).

SUMMARY OF THE INVENTION

However, in the conventional example which adopts a combination of the first fixing mechanism that uses attachment screws and the second fixing mechanism that uses no attachment screw, as was described with reference to FIG. 6, the protruding width of the protrusions 4 from the edge frame 3 is set such that the mating piece 6 can ride over the protrusions 4 by the push-in operation of the mating piece 6 during the assembly process and also such that the engaging openings 7 in the mating piece 6 can be disengaged from the protrusions 4 through the operation of stripping the engaging openings 7 off of the protrusions 4 during the disassembly process. Therefore, the engaging width (latching margin) between the protrusions 4 and the corresponding engaging openings 7 at the mating locations must be set with a relatively high degree of precision, and if the engaging width is too large, the engaging openings 7 cannot be stripped off of the protrusions 4, which tends to create a hindrance during reworking. On the other hand, if the engaging width is too small, when the cabinet falls off or the like, the engaging openings 7 easily come off of the protrusions 4 due to this impact. Accordingly, with the conventional example described above, there is a problem in that the adjustment of the engaging width is difficult.

Furthermore, even if the engaging width is appropriately adjusted, when the operation of stripping the engaging openings 7 in the mating piece 6 off of the protrusions 4 is performed in the disassembly process, there is also the risk excessive force being applied to the protrusions 4 and the engaging openings 7, causing these to break.

In relation to this, Japanese Patent Application Laid-Open Publication No. 2009-151112 (FIG. 2) and Japanese Patent Application Laid-Open Publication No. 2010-191407 (paragraph [0007] and FIG. 4) merely disclose the application of a so-called screw fastening structure to the cabinet assembly, and Japanese Patent Application Laid-Open Publication No. 2008-298964 (FIG. 6) indicates nothing more than the insertion of the front cabinet between the rear cabinet and the front cover.

In view of the problems and circumstances described above, a preferred embodiment of the present invention provides a display device cabinet in which a fixing assembly that joins a front panel that houses a display module and a rear panel includes a combination of a first fixing mechanism that includes attachment screws and a second fixing mechanism that includes no attachment screws, and provides a display device cabinet having a structure such that, even though a mating structure between protrusions on a side of an edge frame of the front panel and engaging openings provided in a mating piece on a side of the rear panel defines the second fixing mechanism, the protrusions and the engaging openings are not easily disengaged from each other.

According to another preferred embodiment of the present invention, a display device cabinet is provided in which the assembly process and disassembly process of the cabinet can be performed without applying excessive force to the protrusions and the engaging openings.

The display device cabinet according to a preferred embodiment of the present invention is a display device cabinet including a frame-shaped front panel that houses a display module and that is deployed around a display surface of the display module, a rear panel that is joined to the front panel, and a fixing assembly that joins the front panel and the rear panel, with the fixing assembly including a combination of a first fixing mechanism that includes attachment screws and a second fixing mechanism that includes no attachment screw.

In addition, the second fixing mechanism preferably includes protrusions arranged to protrude inward on an edge frame of the front panel that faces the outer frame of the display module spaced at a distance from each other; a mating piece that is provided on the rear panel and that is fitted inside the edge frame of the front panel in an overlapping manner; engaging openings that are provided in the mating piece and that respectively mate with the protrusions; and stopper elements that are provided on the rear panel and that are located in a space between the outer frame of the display module and the edge frame of the front panel, and the stopper elements include contact portions that prevent the protrusions from slipping out of the engaging openings by contacting the outer frame of the display module.

With this unique configuration, the front panel and the rear panel are joined by screw fastening via the first fixing mechanism and joined by the mating structure between the protrusions and the corresponding engaging openings of the second fixing mechanism. Furthermore, the stopper elements include contact portions that prevent the protrusions from slipping out of the engaging openings by contacting the outer frame of the display module at the joined locations via the second fixing mechanism, such that the stopper elements prevent the protrusions from slipping out of the engaging openings and becoming disengaged. Therefore, even if a drop impact is applied to the cabinet following assembly, a situation in which the protrusions slip out of the engaging openings and end up being disengaged due to this impact is not very likely to arise.

In another preferred embodiment of the present invention, the stopper elements preferably have a shape that makes it possible to have the engaging openings in the mating piece engaged with the protrusions by inserting the mating piece in the inside of the edge frame of the front panel while maintaining the rear panel in an inclined orientation, and to cause the engaging openings to mate with the protrusions by changing the orientation of the rear panel from the inclined orientation to a horizontal orientation in which the rear panel is joined to the front panel while avoiding interference between the stopper elements and the outer frame of the display module.

If the shape of the stopper elements is configured as described above, there is no need to apply excessive force to the protrusions and the engaging openings during the assembly process and disassembly process of the cabinet. Therefore, it is possible to avoid a situation in which excessive force is applied to the protrusions and the engaging openings during the assembly process and disassembly process, causing these elements to break.

In a further preferred embodiment of the present invention, the stopper elements preferably are defined by rib-shaped plates that are preferably made of a molded resin and are integral with the rear panel that includes the mating piece, each of the plates is provided on the rear panel and the mating piece in a continuous manner, and one end edge of each of the plates in the width direction defines a contact portion. This unique configuration provides an advantage in that the rib-shaped plates defining the stopper elements are useful as reinforcing ribs that reinforce the rear panel and the mating piece.

In a further preferred embodiment of the present invention, a distance between the contact portions of the stopper elements and the outer frame of the display module is preferably smaller than the engaging width at the mating locations between the protrusions and the respective engaging openings, and as a result of a removed portion preferably being provided on each of the plates by removing the corner portion defined by one end edge of the plate in the width direction defining the contact portion of the stopper element and the end edge in the height direction thereof, it is possible to change the orientation of the rear panel from the inclined orientation to the horizontal orientation in which the rear panel is joined to the front panel while avoiding the interference between the stopper elements and the outer frame of the display module. This unique configuration has an advantage in that the shape of the rib-shaped plates defining the stopper elements is simplified, so it becomes corresponding easier to form the molding surface of the mold for molding the stopper elements.

In another preferred embodiment of the present invention, the front panel and the rear panel are joined to define the cabinet for a vertically placed-type thin liquid crystal television, the first fixing mechanism joins the front panel and the rear panel at lower portions thereof, and the second fixing mechanism joins the front panel and rear panel and upper portions thereof. This unique configuration facilitates the assembly process and disassembly process of the cabinet for a thin liquid crystal television.

As described above, various preferred embodiments of the present invention provide a cabinet that is immune to damage to the protrusions and the engaging openings during the disassembly process at the time of reworking of the cabinet, in particular, inexpensively without adding components or parts. Moreover, by providing rib-shaped plates to define the stopper elements, the plates reinforce the rear panel and the mating piece.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
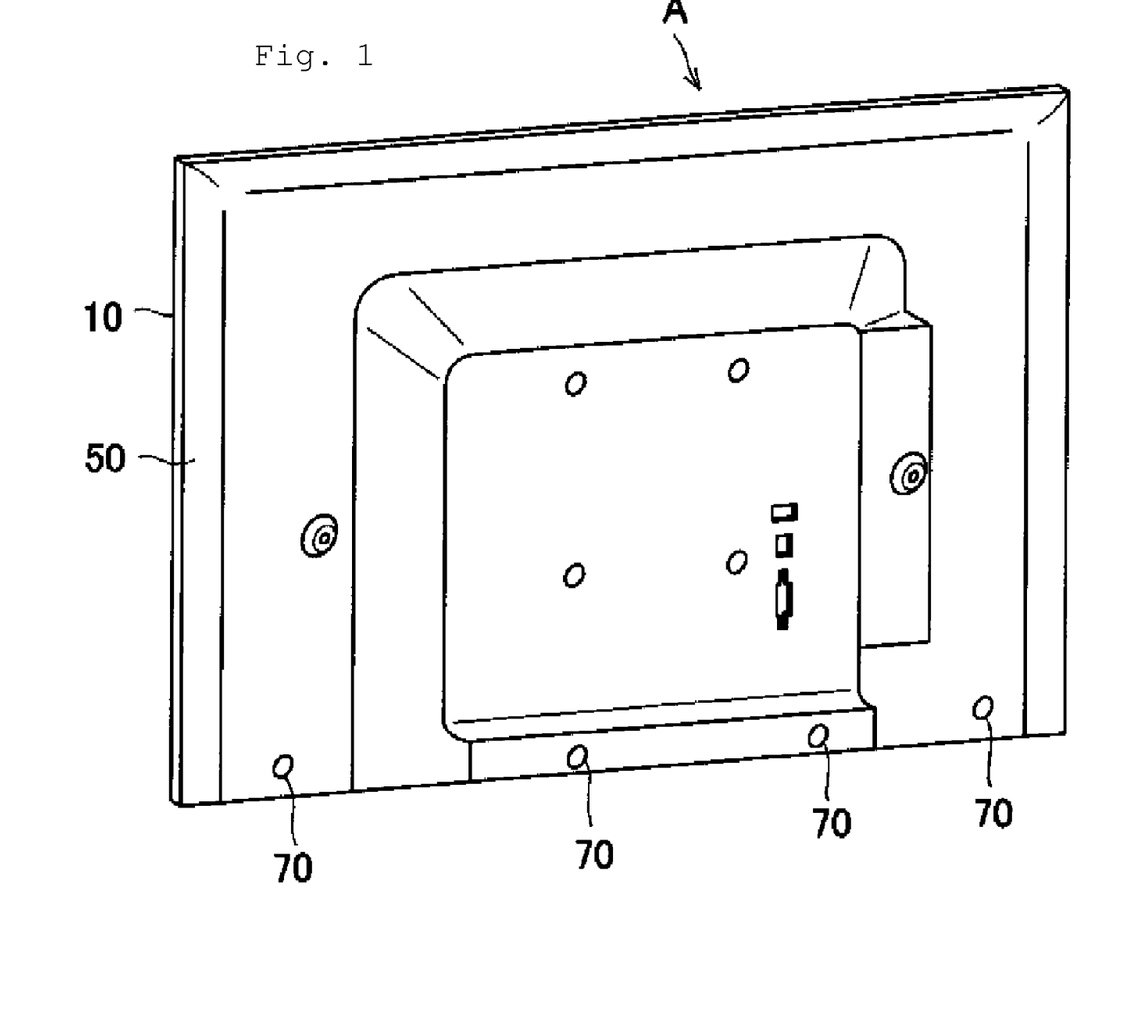
FIG. 1 is a schematic perspective view of the display device cabinet according to a preferred embodiment of the present invention as seen from the back.
Figure 2:
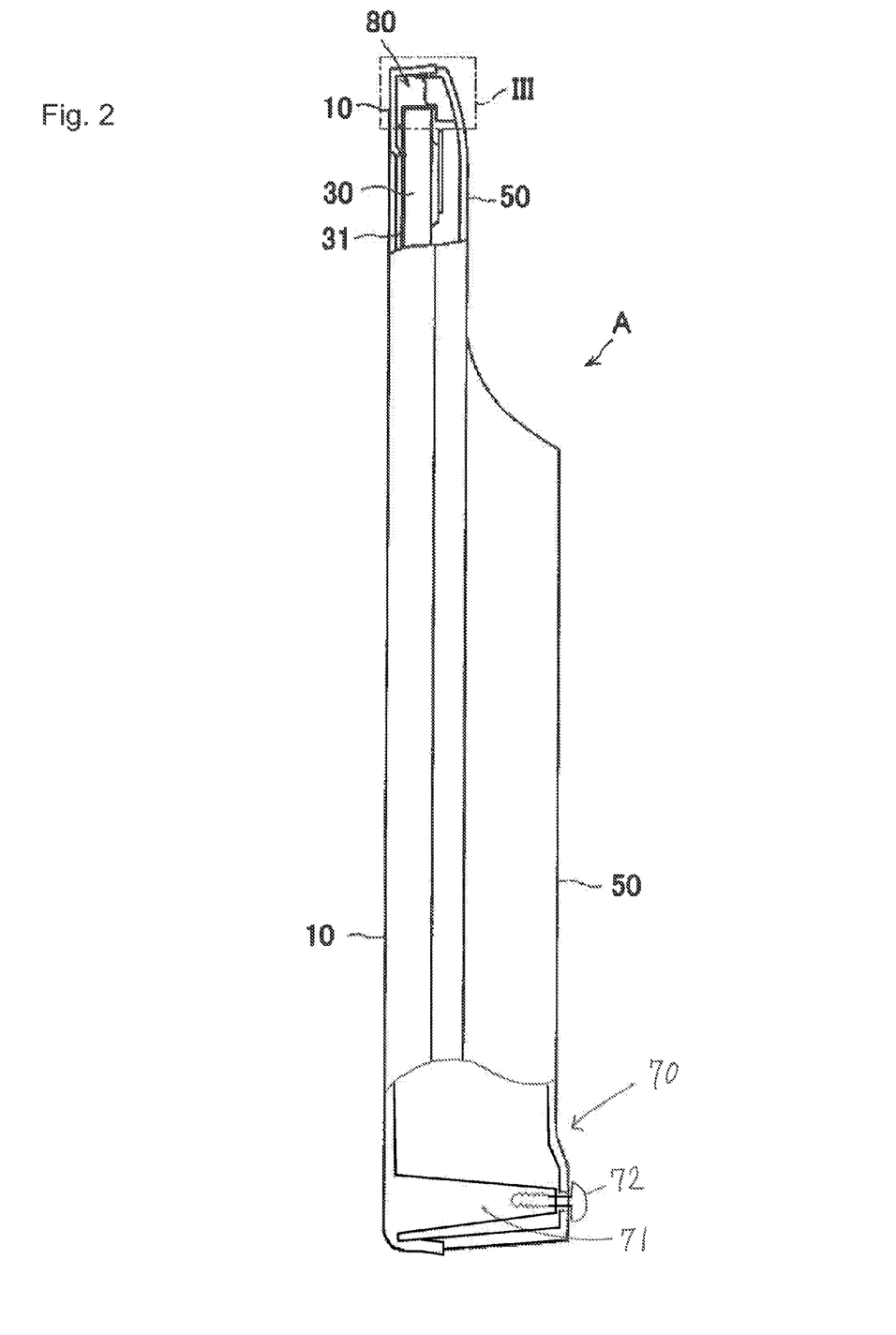
FIG. 2 is a side view showing the cabinet of FIG. 1 with a portion thereof cut off.

FIG. 1 is a schematic perspective view of the display device cabinet A according to a preferred embodiment of the present invention as seen from the back, and FIG. 2 is a side view showing the same cabinet A with a portion thereof cut off.

The cabinet A constitutes the cabinet preferably for use with a vertically placed-type thin liquid crystal television and includes a frame-shaped front panel 10 and a rear panel 50 joined to the front panel 10. Furthermore, the two panels 10 and 50 are joined by a fixing assembly including a combination of a first fixing mechanism that uses attachment screws and a second fixing mechanism that uses no attachment screws, which will be described later.

A liquid crystal display module as a display module 30 is attached to and housed in the front panel 10, and the display module 30 is covered by the rear panel 50 from the back surface side. Then, the frame-shaped front panel 10 is deployed around the display surface 31 of the liquid crystal module 30.

A first fixing mechanism 70 that uses attachment screws is configured by screwing attachment screws 72 that are inserted through screw insertion holes provided in the rear panel 50 at locations in the vicinity of the lower end thereof into bosses 71 provided on the front panel 10 at locations in the vicinity of the lower end thereof and by tightening the attachment screws 72 as shown in FIG. 2. As is shown in FIG. 1 as an example, this first fixing mechanism 70 joins the front panel 10 and the rear panel 50 at a plurality of locations in the vicinity of the lower end in the height direction of the location where the front panel 10 and the rear panel 50 are joined, for example.

A second fixing mechanism 80 that uses no attachment screw is used to join the front panel 10 and the rear panel 50 at locations in the vicinity of the upper end of the cabinet A as shown in FIG. 2. Next, the configuration of this second fixing mechanism 80 will be described.

Figure 3:
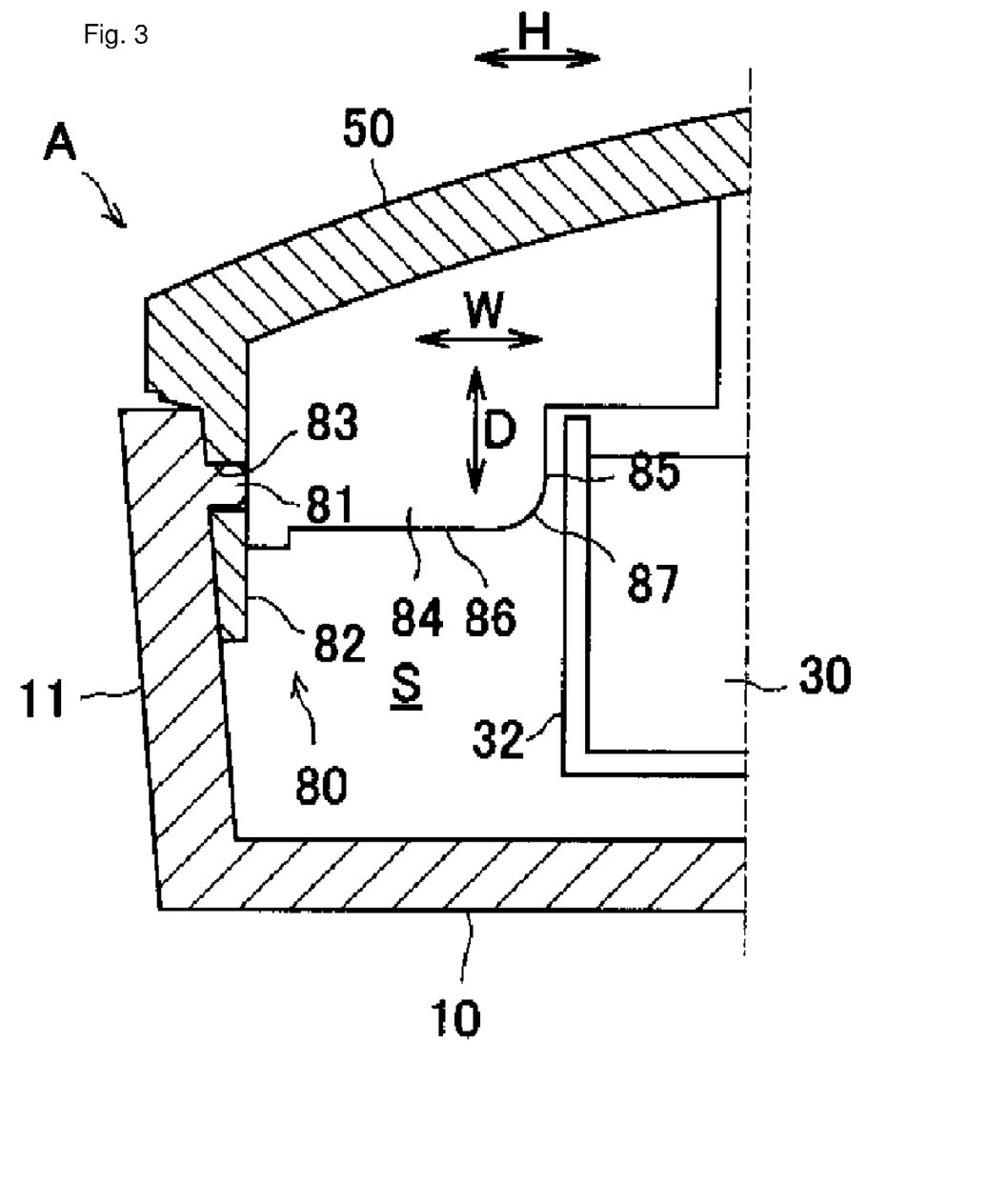
FIG. 3 is a longitudinal sectional view showing the portion III of FIG. 2.

FIG. 3 is a longitudinal sectional view showing the portion III of FIG. 2. FIG. 3 shows a state in which the cabinet A is placed in a laid-down orientation with the front panel 10 being on the lower side.

As is shown in FIG. 3, the front panel 10 preferably is a resin molded body integrally provided with an edge frame 11, and the edge frame 11 faces, spaced at a certain distance, an outer frame 32 of the display module 30 that preferably has a rectangular or substantially rectangular shape when seen in a front view and that is housed in the front panel 10. In the illustrated example, the outer surface of the outer frame 32 facing the edge frame 11 is a flat surface. Moreover, protrusions 81 facing inward are provided on the edge frame 11. The protrusions 81 are preferably molded from a resin integrally with the front panel 10, for example.

The rear panel 50 joined to the front panel 10 is provided with a mating piece 82 that is fitted inside of the edge frame 11 of the front panel 10 in an overlapping manner, and engaging openings 83 provided in the mating piece 82 respectively mate with the protrusions 81. In addition, the sizes of the engaging openings 83 and protrusions 81 are set such that vibration or wobble that is greater than permissible does not occur at the locations where the engaging openings 83 and the protrusions 81 mate.

Furthermore, stopper elements 84 preferably defined by rib-shaped plates are preferably integrally molded from a resin on the rear panel 50, for example. Each of the rib-shaped plates defining the stopper elements 84 is provided not only on the rear panel 50 but also on the mating piece 82 in a continuous manner. Therefore, the stopper elements 84 are useful as the reinforcing ribs that reinforce the mating piece 82 and the rear panel 50.

Moreover, the stopper elements 84 defined by the rib-shaped plates are deployed in the space S between the edge frame 11 of the front panel 10 and the outer frame 32 of the display module 30. Then, one end edge in the width direction W of each of the rib-shaped plates defining the stopper elements 84 is provided as a contact portion 85, and the contact portion 85 faces the outer frame 32 of the display module 30 in a position of close proximity.

Here, if the engaging width (latching margin) at the mating locations between the protrusions 81 on the side of the front panel 10 and the corresponding engaging openings 83 in the mating piece 82 on the side of the rear panel 50 is compared with the distance between the contact portions 85 of the stopper elements 84 and the outer frame 32 of the display module 30, the distance between the contact portions 85 and the outer frame 32 is smaller than the engaging width. Therefore, in a state in which the front panel 10 and the rear panel 50 are not joined by the first fixing mechanism 70 (see FIG. 1), even if the front panel 10 and the rear panel 50 are positionally shifted from each other in the height direction H thereof (corresponding to the horizontal direction in FIG. 3, which coincides with the width direction W of the plates), this positionally-shifted width will never exceed the distance between the contact portions 85 and the outer frame 32. In other words, as a result of the contact portions 85 contacting the outer frame 32, the positionally-shifted width is suppressed to a width smaller than the engaging width at the mating locations. Accordingly, even if such a positional shifting occurs between the front panel 10 and the rear panel 50, there is no possible way to create a situation in which the joined state obtained by the second fixing mechanism 80 ends up being released by the engaging openings 83 slipping off of the corresponding protrusions 81.

In addition, the positional shifting does not occur in a state in which the cabinet A is assembled by joining the front panel 10 and the rear penal 50 via the first fixing mechanism 70. Furthermore, the effect described above is exhibited such that the positionally-shifted width between the front panel 10 and the rear panel 50 is suppressed to a width smaller than the engaging width at the mating locations by the contact portions 85 contacting the outer frame 32, so even if a drop impact is applied to the cabinet A following assembly, it is not very likely to result in a situation in which the protrusions 81 come out of the corresponding engaging openings 83 and end up being disengaged.

In the present preferred embodiment, the corner portion of each of the rib-shaped plates defining the stopper elements 84, in concrete terms, the corner portion defined by one end edge in the width direction W of each of the plates defining the contact portion 85 and the end edge 86 in the height direction D of the plate, is removed to define a rounded chamfered shape. This removed portion is indicated with symbol 87 in FIG. 3. Moreover, as a result of the removed portion 87 being provided at the corner portion of each of the rib-shaped plates defining the stopper elements 84 as described above, it becomes possible to change the orientation of the rear panel 50 from an inclined orientation to a horizontal orientation in which the rear panel 50 is joined to the front panel 10 while avoiding interference between the stopper elements 84 and the outer frame 32 of the display module 30.

Figure 4:
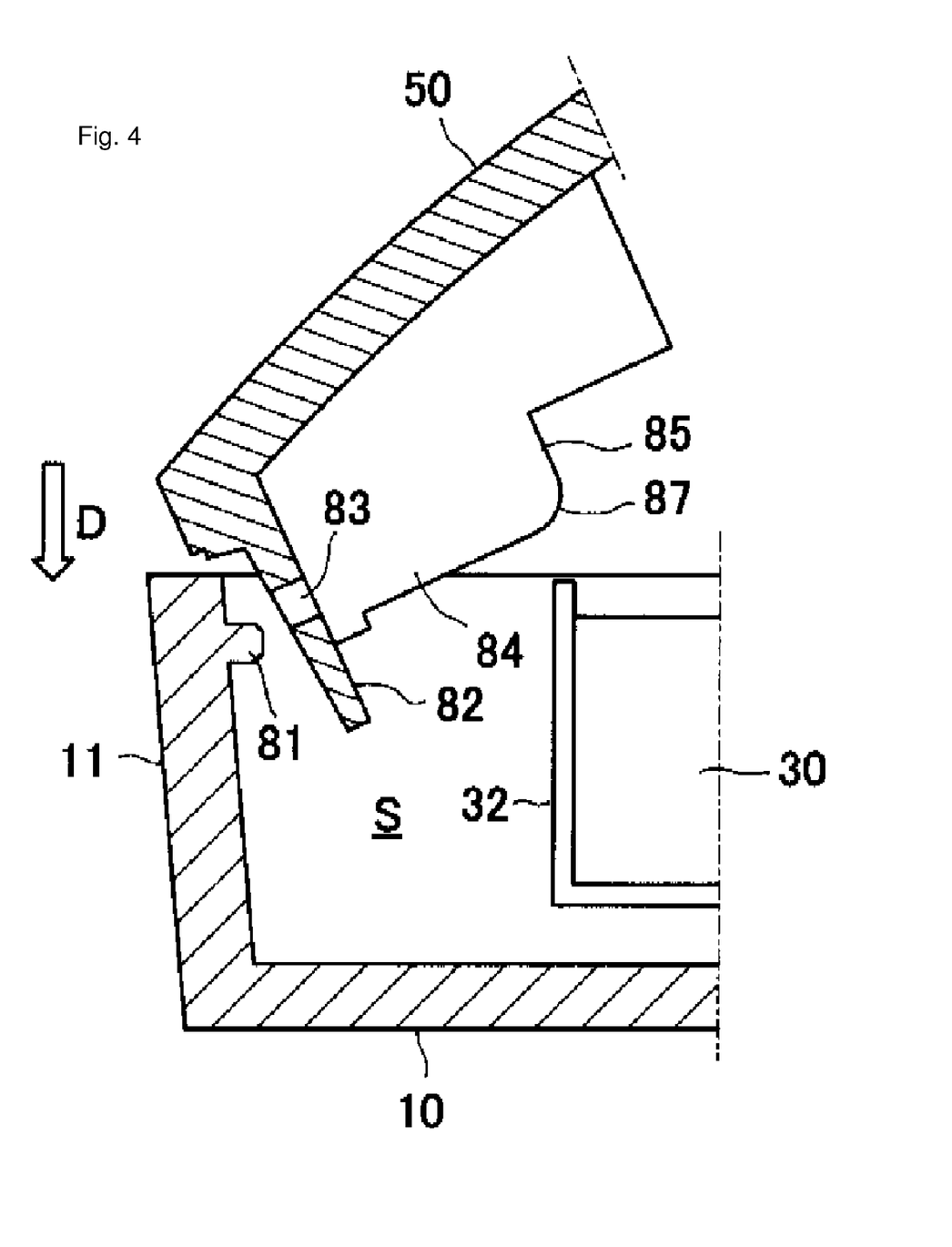
FIG. 4 is a longitudinal sectional view of principal portions showing as an example the initial stage of the cabinet assembly process.

This point will be described in more detail with reference to FIGS. 4 and 5. FIG. 4 is a longitudinal sectional view of principal portions showing as an example the initial stage of the assembly process, and FIG. 5 is a longitudinal sectional view of principal portions showing as an example a state in which the assembly process transitions from an intermediate stage to the final stage.

In the initial stage of the assembly process of the cabinet A of the present preferred embodiment, an operation is performed in which the mating piece 82 on the side of the rear panel 50 is inserted as shown in arrow D in the inside of the edge frame 11 of the front panel 10 that is deployed in a horizontal orientation while maintaining the rear panel 50 in an inclined orientation such that the upper end portion thereof faces downward as shown in FIG. 4. Then, through such an insertion operation of the mating piece 82, an operation for an intermediate stage is performed in which each of the engaging openings 83 in the mating piece 82 is caused to engage with the corresponding protrusion 81 as shown in FIG. 5. Then, in the final stage, an operation is performed in which the rear panel is caused to approach the horizontal orientation while the engaging openings 83 are respectively engaged with the protrusions 81 as shown in FIG. 5, so the mating piece 82 is brought closer to the edge frame 11 of the front panel 10 as shown in arrow Y in FIG. 5 and superimposed on the inside thereof, and the engaging openings 83 are caused to mate respectively with the protrusions 81, thereby obtaining the configuration shown in FIG. 3.

Figure 5:
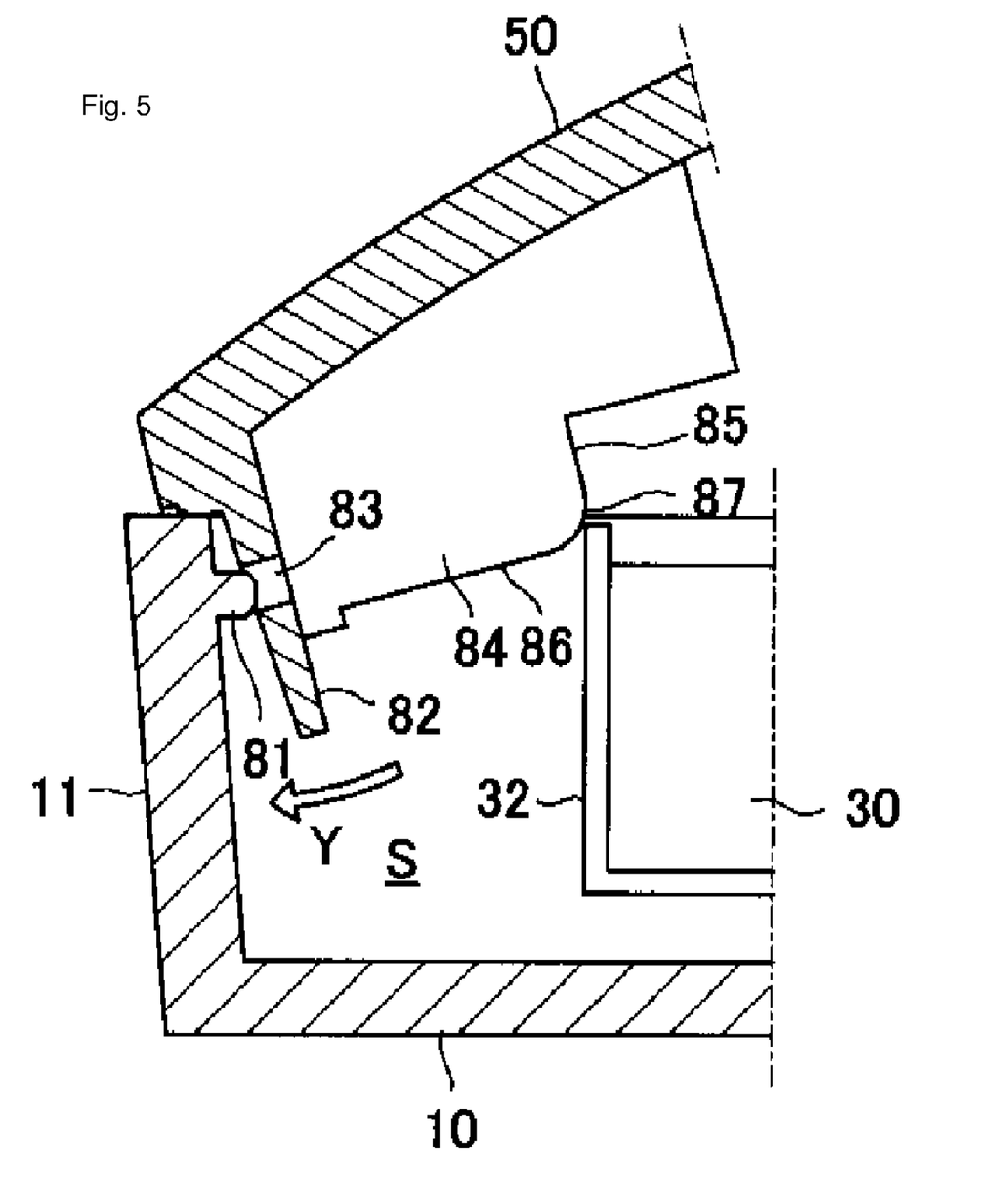
FIG. 5 is a longitudinal sectional view of principal portions showing as an example a state in which the cabinet assembly process transitions from an intermediate stage to the final stage.

Now, if a hypothetical case is considered in which the corner portion of each of the rib-shaped plates defining the stopper elements 84 does not have the removed portion 87, in order to make the transition possible from the intermediate stage to the final stage shown in FIG. 5, it is required that the length in the width direction W (see FIG. 3) of the plates be set to be short to the extent that the corner portions of the plates do not interfere with the outer frame 32 of the display module 30 when the orientation of the rear panel 50 is changed from the inclined orientation to the horizontal orientation in which the rear panel 50 is joined to the front panel 10. However, doing this results in an increase in the distance between the contact portions 85 and the outer frame 32 when the rear panel 50 is joined to the front panel 10 that is in the horizontal orientation as shown in FIG. 3. Thus, in order to have the effect of these contact portions 85 exhibited reliably, it becomes necessary to increase the engaging width at the mating locations between the protrusions 81 and the corresponding engaging openings 83. In addition, if this requirement is satisfied by increasing the protruding width of the protrusions 81, then a problem occurs in that the protrusions 81 become susceptible to breakage.

In light of this, the corner portions of the rib-shaped plates defining the stopper elements 84 are respectively provided with the removed portions 87 as described above in this preferred embodiment. With this configuration, even if the distance between the outer frame 32 and the contact portions 85 when the rear panel 50 is joined to the front panel 10 that is in the horizontal orientation as shown in FIG. 3 is reduced by increasing the length of the plates in the width direction W, the plates (stopper elements 84) can be inserted effortlessly into the space S between the edge frame 11 of the front panel 10 and the outer frame 32 of the display module 30 at the initial stage shown in FIG. 4. Furthermore, during the transition from the intermediate stage to the final stage shown in FIG. 5 as well, the plates (stopper elements 84) can be inserted effortlessly into the space S without the corner portions of the plates interfering with the outer frame 32 of the display module 30. Accordingly, in the present preferred embodiment, the shape of the rib-shaped plates defining the stopper elements 84 preferably is a shape that enables the operation of the initial stage which is such that the engaging openings 83 in the mating piece 82 are respectively engaged with the protrusions 81 by inserting the mating piece 82 into the interior of the edge frame 11 of the front panel 10 while maintaining the rear panel in the inclined orientation and the operation of the final stage which is such that the engaging openings 83 are caused to mate respectively with the protrusions 81 by changing the orientation of the rear panel 50 from the inclined orientation to the horizontal orientation in which the rear panel 50 is joined to the front panel 10 while avoiding the interference between the stopper elements 84 and the outer frame 32 of the display module 30.

During disassembly of the cabinet A by removing the rear panel 50 from the front panel 10 in the case of reworking or the like, the following work is performed: the attachment screws of the first fixing mechanism 70 are removed, and the lower end portion of the rear panel 50 is then lifted up to take the engaging openings 83 out of the protrusions 81 as shown in FIG. 5, after which the mating piece 82 is pulled out of the front panel 10 by pulling up the rear panel 50.

In the cabinet assembly process of the preferred embodiment described above, the engaging openings 83 provided in the mating piece 82 on the side of the rear panel 50 are caused to mate respectively with the protrusions 81 provided on the edge frame 11 of the front panel 10 from a diagonal direction.

Moreover, in the disassembly process, the protrusions 81 are taken out of the engaging openings 83 of the mating piece 82 through the diagonal inclination of the rear panel 50. Therefore, there is no application of excessive force to the protrusions 81 or the engaging openings 83 during the assembly process and the disassembly process, thus obviating damage to the protrusions 81 and the engaging openings 83.

In the present preferred embodiment, the structure that joins the front panel 10 and the rear panel 50 via the second fixing mechanism 80 is preferably applied to a plurality of locations in the vicinity of the upper end in the height direction of the joined portion of the front panel 10 and the rear panel 50 shown in FIG. 1, for example.

In the present preferred embodiment, a non-limiting example was described in which the corner portions of the rib-shaped plates defining the stopper elements 84 are removed to define a rounded chamfered shape, but in this regard, a removed portion having a square chamfered shape may also be provided at each of the corner portions. In addition, instead of providing rib-shaped plates to define the stopper elements 84 as shown in the figures, it is also possible to define the stopper elements 84 with protruding pieces that extend from the mating piece 82 or the inner surface of the rear panel 50 toward the outer frame 32 of the display module 30.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A display device cabinet comprising:
   a frame-shaped front panel that houses a display module and that is deployed around a display surface of the display module;
   a rear panel that is joined to the front panel; and
   a fixing assembly that joins the front panel and the rear panel, the fixing assembly including:
      a first fixing mechanism including attachment screws; and
      a second fixing mechanism that includes no attachment screws; wherein
      the second fixing mechanism includes:
         protrusions arranged to protrude inward on an edge frame of the front panel that faces an outer frame of the display module spaced at a distance from each other;
         a mating piece that is provided on the rear panel and that is fitted inside the edge frame of the front panel in an overlapping manner;
         engaging openings that are provided in the mating piece and that respectively mate with the protrusions; and
         stopper elements that are provided on the rear panel and that are located in a space between the outer frame of the display module and the edge frame of the front panel; wherein
   the stopper elements include contact portions that prevent the protrusions from slipping out of the engaging openings by contacting the outer frame of the display module;
   a corner portion defined by an end edge in a width direction and an end edge in a height direction of each of the contact portions is removed to define a rounded, chamfered shape for the contact portions of each of the stopper elements; and
   the stopper elements are arranged directly between the outer frame of the display module and the protrusions.

2. The display device cabinet according to claim 1, wherein the stopper elements have a shape that makes it possible to have the engaging openings in the mating piece respectively engaged with the protrusions by inserting the mating piece in an inside of the edge frame of the front panel while maintaining the rear panel in an inclined orientation, and to cause the engaging openings to mate with the protrusions by changing the orientation of the rear panel from the inclined orientation to a horizontal orientation in which the rear panel is joined to the front panel while avoiding interference between the stopper elements and the outer frame of the display module.

3. The display device cabinet according to claim 1, wherein the stopper elements are defined by rib-shaped plates made of molded resin and integral with the rear panel including the mating piece, each of the rib-shaped plates is arranged on the rear panel and the mating piece in a continuous manner, and one end edge of each of the rib-shaped plates in the width direction defines one of the contact portions.

4. The display device cabinet according to claim 3, wherein:
   a distance between the contact portions of the stopper elements and the outer frame of the display module is smaller than an engaging width at mating locations between the protrusions and the respective engaging openings;
   rounded portions respectively provided at the one edge of each of the rib-shaped plates in the width direction define the corner portions of the contact portions of the stopper elements and the end edges in the height direction thereof so as to enable a change in the orientation of the rear panel from the inclined orientation to the horizontal orientation in which the rear panel is joined to the front panel while avoiding interference between the stopper elements and the outer frame of the display module; and
   the engaging width is a latching margin at the mating locations between the protrusions and the respective engaging openings in the mating piece.

5. The display device cabinet according to claim 1, wherein the front panel and the rear panel are joined to each other to define the cabinet for a vertically placed-type liquid crystal television, the first fixing mechanism joins the front panel and the rear panel at lower portions of the front and rear panels, and the second fixing mechanism joins the front and rear panels at upper portions thereof.

6. The display device cabinet according to claim 1, wherein the attachment screws of the first fixing mechanism directly contact portions of both of the front panel and the rear panel.

7. The display device cabinet according to claim 1, wherein the stopper elements of the second fixing mechanism are arranged such that the stopper elements do not contact the outer frame of the display module once the front panel and the rear panel are firmly fixed together.

8. The display device cabinet according to claim 1, wherein the first fixing mechanism is arranged on a side of both of the front panel and the rear panel that is opposite from a side where the second fixing mechanism of the front panel and the rear panel is located.

9. The display device cabinet according to claim 1, wherein, when the rear panel is joined to the front panel, the contact portions of the stopper elements come into contact with the outer frame and are positionally shifted by the outer frame, and the contact portions of the stopper elements are positionally shifted by a width that is smaller than a width at the mating locations between the protrusions and the respective engaging openings.

10. The display device cabinet according to claim 1, wherein, if the front panel and the rear panel are shifted from each other in the height direction by a positionally-shifted width when the rear panel is joined to the front panel, the positionally-shifted width is smaller than a width at the mating locations between the protrusions and the respective engaging openings.

11. A display device cabinet comprising:
a front panel that houses a display module and that is deployed around a display surface of the display module;
a rear panel that is joined to the front panel; and
a fixing assembly that joins the front panel and the rear panel, the fixing assembly including:
a first fixing mechanism; and
a second fixing mechanism; wherein
the second fixing mechanism includes:
protrusions arranged to protrude inward on an edge of the front panel that faces an outer frame of the display module spaced at a distance from each other;
a mating piece that is provided on the rear panel and that is fitted inside the edge of the front panel in an overlapping manner;
engaging openings that are provided in the mating piece and that respectively mate with the protrusions; and
stopper elements that are provided on the rear panel and that are located in a space between the outer frame of the display module and the edge of the front panel; wherein
the stopper elements include contact portions that prevent the protrusions from slipping out of the engaging openings by contacting the outer frame of the display module;
a corner portion defined by an end edge in a width direction and an end edge in a height direction of each of the contact portions is removed to define a rounded, chamfered shape for the contact portions of each of the stopper elements; and
the stopper elements are arranged directly between the outer frame of the display module and the protrusions.

* * * * *